3,799,905
DENTAL EPOXIDES
Maurice William Holloway, Winchester, and Brian Edward Causton, Basingstoke, England, assignors to National Research Development Corporation, London, England
No Drawing. Filed Sept. 22, 1971, Ser. No. 182,843
Claims priority, application Great Britain, Sept. 24, 1970, 45,609/70; Apr. 30, 1971, 12,542/71
Int. Cl. C08g 51/04
U.S. Cl. 260—37 EP                    11 Claims

ABSTRACT OF THE DISCLOSURE

A pack suitable for the production of a cured polyepoxide resin composition, which comprises a polyepoxide resin, a curing agent comprising a complex of a Friedel-Crafts' catalyst and an aqueous strong non-carboxylic acid or aqueous fluoacid, and means to prevent premature reaction between the resin and the curing agent.

---

This invention relates to polyepoxide resins, and is more particularly concerned with polyepoxide resin compositions adapted for use in the field of dentistry.

Polyepoxide resins are available as liquids which can be cured at ambient temperature with negligible shrinkage to yield tough hard materials with high chemical and water resistance suitable for use in dental restorative work. It is known that Friedel-Crafts' catalysts have a very rapid curing action on such resins and because the curing reaction is uncontrollably rapid it has been proposed to use complexes of the catalysts with alcohols, ethers, ketones, carboxylic acids (and anhydrides), and carboxylic acid amines, the choice of complex inter alia determining the speed of curing. For example, U.K. Pat. 827,699 discloses a stable complex of a Friedel-Crafts' catalyst with an organic compound for curing polyepoxide resins for dental restorations and prostheses: for preparing the stable complex an organic compound selected from the aforementioned list is specified. U.K. Pat. 882,360 discloses a process for producing polyepoxide dental restorations and prostheses, producing a hard material in a few minutes at mouth temperature, using as curing agent a complex of a Friedel-Crafts' catalyst and a polyhydric alcohol or alcohol mono-ether having the advantage that the complexes are built into the hardened resin.

However, the use of Friedel-Crafts' catalyst for curing polyepoxide resins in moist conditions such as are found in the mouth, for example, has always been hampered by the susceptibility of the catalysts to hydrolysis which renders the catalyst inactive.

According to the present invention there is provided a complexed Friedel-Crafts' catalyst, suitable for use in the curing of polyepoxide resins, having improved properties in this respect.

The present invention provides a pack suitable for the production of a cured polyepoxide resin composition, which comprises a polyepoxide resin, a curing agent comprising a complex of a Friedel-Crafts' catalyst and an aqueous strong non-carboxylic acid or aqueous fluoacid and means to prevent premature reaction between the resin and the curing agent.

The invention also includes a process for the production of a cured polyepoxide resin composition, which comprises forming a mixture between a polyepoxide resin and a curing agent comprising a complex of a Friedel-Crafts' catalyst and an aqueous strong noncarboxylic acid or aqueous fluoacid.

Polyepoxide resins suitable for use in the present invention include particularly those derived from dihydric phenols, these having at least two epoxide groups per molecule of resin and not more hydroxyl groups per molecule than epoxide groups. Excellent results have been obtained with low molecular weight condensation products of diphenylolpropane with epichlorohydrin.

The curing agent comprises a complex of a Friedel-Crafts' catalyst and an aqueous strong non-carboxylic acid or aqueous fluoacid. The Friedel-Crafts' catalyst may, for example, be a halide of aluminium, boron, antimony, titanium, silicon, iron or tin, or mixtures thereof. Excellent results have been obtained with $BF_3$, $SbCl_5$, $TiCl_4$, $SiCl_4$, $FeCl_3$, $AlCl_3$ and $SnCl_4$.

The aqueous strong non-carboxylic acid may be an inorganic acid such as for example nitric acid, hydrochloric acid, or an organic acid for example a sulphonic acid such as p-toluene sulphonic acid and preferably benzene m-disulphonic acid. The term strong acid in this specification includes acids having a dissociation constant (K value) of not less than $5 \times 10^{-4}$ and preferably not less than $1 \times 10^{-3}$. The fluoacid is preferably an acid of fluorine having a dissociation constant (K value) of less than $5 \times 10^{-4}$ and is most preferably hydrofluoric acid. Concentrated solutions of the acids containing at least 30 v/o of the acid are preferred. Mixtures of the acids may be used.

The complex is preferably formed by adding the Friedel-Crafts' catalyst to the aqueous strong non-carboxylic acid with continual stirring. Preferably the proportion by weight of the catalyst to the acid solution is from 1:2 to 1:4, such as for example 1:3.

The pack may be a two part pack in which the ratio of curing agent to polyepoxide resin in the two parts is preferably from 0.02 to 0.2 millilitre per gram so that when the entire contents of the two parts are mixed together a rapidly hardening polyepoxide resin composition is obtained. In another embodiment the pack may contain the polyepoxide resin and the curing agent in separate capsules, the total amount of polyepoxide resin in the pack and the total amount of curing agent in the pack being in the desired ratio. In a further embodiment both components may be encapsulated in the same capsule, in the desired ratio, provided that steps are taken to prevent premature reaction, for example, by the provision of a membrane between the components which may be ruptured before use.

Where the polyepoxide resin compositions are to be used in restorative dentistry it is usually desirable to reduce the thermal co-efficient of expansion of the composition and to render it opaque. This may conveniently be achieved by including in the composition up to about 4 times the weight of resin, and preferably 1.5 to 2.5 times the weight of resin, of an inert mineral in powder form. The inert mineral may be premixed with one or both of the components prior to the curing step but preferably it is premixed with the resin. The inert mineral should be chosen so that the final composition resembles as closely as possible a natural tooth in appearance. Suitable inert minerals include silica and quartz, which preferably have a particle size of less than 100 mesh, such as for example 300 mesh. When using the invention for the production of dental restorations and prostheses, the polyepoxide resin preblended with the inert mineral is mixed with the curing agent to form a putty, and then introduced into, for example, a dental cavity, formed to shape, and allowed to cure. The nature of the present invention is hereafter further explained by way of example by reference to epoxide composition produced according to the invention and to the curing of these compositions in moist environments.

EXAMPLE 1

Curable epoxide compositions are made by mixing a polyepoxide resin mix with each of a series of complexes of $SbCl_5$, $SnCl_4$ and $BF_3$, the halides being complexed with sulphonic acids, nitric acid and hydrochloric acid. The polyepoxide resin mix, in each of the $SbCl_5$ and $SnCl_4$ complexed compositions, is a mix of Epikote 828 resin (a polyepoxide resin supplied by Shell Chemicals Ltd. and believed to be a low molecular weight condensation product of diphenylolpropane with epichlorohydrin) with 300 mesh acid-washed silica powder, this being inert mineral material: the mix consists of 0.4 gm. Epikote resin for each 0.6 gm. of silica powder. The polyepoxide resin mix, in each of the $BF_3$ complexed compositions is a mix of MY 750 resin (supplied by CIBA (ARL) Ltd. and believed to be a low molecular weight condensation product of diphenylolpropane with epichlorohydrin) with 300 mesh acid-washed silica powder. A suitable silica powder for use with the resin is Lockaline sand. The sand is thoroughly acid-washed (with aq. $HNO_3$) until the washings show no discoloration. The washed and, subsequently, dried sand is then silane treated to improve adhesion to the resin: a silane solution e.g. 2% aqueous glycidoxy propyltrimethoxy silane is mixed with the sand to form a slurry, the slurry is oven-dried and the treated sand sieved to recover the 300 mesh fraction. The Lockaline sand is used with the proportions 1.50:1 sand to resin by weight.

The halides are complexed by slowly adding each halide to an aqueous solution of each complexing acid the addition being effected at room temperature with continual stirring; both $SbCl_5$ and $SnCl_4$ being liquids at ambient temperature and $BF_3$, added as $BF_3.2H_2O$, also a liquid at ambient temperature. The halides and the $BF_3$ dihydrate are aded to the acid solutions in proportions of 1:3 by wt. The acid solutions are as follows: 35 v/o HCl, 70 v/o $HNO_3$, 60 v/o para-toluene sulphonic acid and 33 v/o benzene-m-disulphonic acid. The complexed halide is added to the resin mix in each composition, in amounts of 0.02 ml. of complex to 1.0 gm. of mix.

Measurements are made of gel time and cure time initially in a dry environment i.e., ambient humidity to establish the catalytic activity of each complex and to show that the prepared compositions cure in a reasonable time. The gel time is considered as the time interval during which the resin-complex mix remains a putty and the cure time is considered the interval after which the surface can no longer be indented or deformed by hand pressure with a spatula blade. The following gel and cure times are obtained.

To illustrate the cure of compositions in moist environments the resin mix and complex components of compositions based on $SnCl_4$ and $SbCl_5$ are first mixed in air for 30 secs. and then put in a humidity oven at 100%

TABLE 1

| | Halide | | | | | |
|---|---|---|---|---|---|---|
| | $SbCl_5$ | | $SnCl_4$ | | $BF_3.2H_2O$ | |
| Strong non-carboxylic acid | Gel time | Cure time | Gel time | Cure time | Gel time | Cure time |
| HCl (35% solution) | 8'0" | ---------- | 2'10" | 5'45" | 3'30" | >6'0" |
| $HNO_3$ (70% solution) | 1'20" | 10'0" | 1'20" | 1'35" | 0'25" | 0'25" |
| Para-toluene sulphonic acid (60%) | 1'40" | 3'30" | 1'5" | 1'20" | 1'15" | 1'15" |
| Benzene m-di-sulphonic acid (33%) | 1'15" | 11'0" | 1'30" | 2'15" | 2'0" | 2'5" |

RH (relative humidity) and 37° C. The following cure times—Table 2—are obtained, compared with cure times at ambient humidity.

The table also includes post-cure hardness values of the compositions recorded after leaving for 4 hrs. in air and 4 hrs. in the oven: the hardness values record the force applied to a 1/32" dia. steel ball to form an indentation 0.010" deep.

TABLE 2

| Complex | Cure in air | Cure at 100% RH at 37° C. | Hardness air cure plus 4 hrs., lbf. | Hardness moist cure plus 4 hrs. in oven, lbf. |
|---|---|---|---|---|
| $SnCl_4$ plus 33 v/o benzene sulphonic acid | 2'15" | 2'0" | 47.5 | 57.5 |
| $SnCl_4$ plus 35 v/o HCl | 5'45" | 16'15" | 10.2 | 62.3 |
| $SnCl_4$ plus 70 v/o $HNO_3$ | 1'35" | 1'25" | 45.0 | 59.0 |
| $SbCl_5$ plus 70 v/o $HNO_3$ | 10'0" | 11'0" | 49.0 | 58.0 |
| $SbCl_5$ plus 60 v/o toluene sulphonic acid | 3'30" | 1'10" | 41.5 | 56.5 |

In a more stringent evaluation, the curability of compositions in moist conditions is assessed by making additions of up to 10 w/o water to the resin mix, based on the resin content of the mixture, the water being added to and blended with the mix before the addition of complex thereto. The results which follow are obtained for complex additions varying in the range 0.02 to 0.2 ml. per gm. of mix. The compositions assessed are those in which the halides are complexed with sulphonic acids, $SnCl_4$ being complexed with benzene sulphonic acid and $SbCl_5$ with toluene sulphonic acid, Table 3, and $BF_3$ (as $BF_3 2H_2O$) with benzene sulphonic acid, Table 4.

TABLE 3.—EFFECT OF WATER ON CURE TIMES

| Catalyst system | Ml./g. | Nil | | 1 w/o water | | 5 w/o | | 7.5 w/o | | 10 w/o | |
|---|---|---|---|---|---|---|---|---|---|---|---|
| | | Gel | Cure | Gel | Cure | Gel | Cure | Gel | Cure | Gel | Cure |
| $SnCl_4$/benzene sulphonic acid | 0.02 | 1'30" | 2'15" | ~7'0" | ~68'0" | ~14'0" | >8 hr. | ~31' | >8 hr. | ~53' | >8 hr. |
| | 0.03 | 2'15" | 6'30" | 3'30" | 6'0" | ---------- | >8 hr. | ---------- | >8 hr. | ---------- | >8 hr. |
| | 0.04 | 2'0" | 3'15" | 3'0" | ~15'0" | 11'0" | >8 hr. | 14'0" | >8 hr. | 35'0" | >8 hr. |
| | 0.05 | 1'40" | 3'0" | 1'30" | 5'30" | 3'30" | >8 hr. | 6'0" | >8 hr. | 7'30" | >8 hr. |
| | 0.1 | 1'0" | 3'15" | 0'50" | 3'30" | 1'35" | 4'30" | 1'50" | 6'0" | 2'30" | 10'30" |
| | 0.2 | 1'30" | 3'45" | 0'30" | 5'0" | 0'30" | 5'0" | 0'50" | 5'0" | 1'10" | 4'0" |
| $SbCl_5$/toluene sulphonic acid | 0.02 | ---------- | 2'20" | 3'15" | ~9'0" | ~8'0" | ~60'0" | ~30'0" | ~240'0" | ~35'0" | >8 hr. |
| | 0.03 | ---------- | 2'10" | 2'0" | 8'30" | ~6'0" | ~50'0" | ~13'0" | ~80'0" | ~20'0" | ~150'0" |
| | 0.04 | ---------- | 1'20" | ---------- | 1'0" | ~8'0" | ~15'0" | ~6'0" | ~60'0" | ~18'0" | ~140'0" |
| | 0.05 | ---------- | 1'30" | ---------- | 1'15" | 3'45" | ~30'0" | ~5'0" | ~70'0" | ~15'0" | ~130'0" |
| | 0.1 | 0'50" | 3'15" | 0'55" | ~4'0" | 1'30" | ~240'0" | 1'45" | >8 hr. | 2'0" | >8 hr. |
| | 0.2 | 2'0" | >8 hr. | 1'45" | >8 hr. | 2'50" | >8 hr. | ~120'0" | >8 hr. | >2 hr. | >8 hr. |

TABLE 4

| Catalyst system | Ml./g. | Nil | | 1 w/o water | | 5 w/o | | 7.5 w/o | | 10 w/o | |
|---|---|---|---|---|---|---|---|---|---|---|---|
| | | Gel | Cure | Gel | Cure | Gel | Cure | Gel | Cure | Gel | Cure |
| $BF_3.2H_2O$/benzene sulphonic acid | 0.02 | 2'0" | 2'5" | 3'0" | 3'15" | >6'0" | >8'0" | >8'0" | >8'0" | >8'0" | >8'0" |
| | 0.03 | 1'5" | 1'5" | 1'45" | 1'45" | >6'0" | 8'0" | >8'0" | >8'0" | >8'0" | >8'0" |
| | 0.04 | 0'50" | 0'50" | 1'25" | 1'25" | 4'15" | 4'15" | 7'30" | 7'30" | >8'0" | >8'0" |
| | 0.05 | 0'45" | 0'45" | 1'25" | 1'25" | 3'35" | 3'35" | 4'40" | 4'40" | 8'0" | 8'0" |
| | 0.10 | 0'40" | 0'40" | 1'5" | 1'5" | 2'5" | 2'5" | 2'45" | 2'45" | 3'20" | 3'20" |
| | 0.20 | 0'50" | 0'50" | 1'10" | 1'10" | 1'35" | 1'35" | 1'50" | 1'50" | 2'10" | 2'10" |

The results of Table 3 show, in particular, that with higher amounts of the SnCl$_4$/benzene sulphonic acid complex, within the stated range, a reasonable cure time can be achieved with up to 10 w/o water in the resin mix. For comparable cure times the water tolerance of the SbCl$_5$/toluene sulphonic acid complex, used in controlled amounts, is not much more than 1%. However it has to be realized that the blending in of even 1% water with the resin mix represents an exceptionally severe moist environment.

Table 4 shows that with higher amounts of the BF$_3$·2H$_2$O/benzene sulphonic acid complex very reasonable cure times can be achieved with up to 10 w/o water in the resin mix.

The importance of epoxide compositions according to the invention resides in the fact that a dental cavity cannot be kept completely dry prior to insertion of a dental filling material therein because of the moisture of the mouth and the continuous exudation of moisture from tubules in the dentine.

The resistance of cured compositions to sustained exposure to moisture, such as are found in the mouth, is evaluated by hardness and compressive strength measurements. Specimens are stored at 40° C. and 100% relative humidity, a film of water depositing on the specimen surfaces, for periods of 14, 28, 100 and 133 days. The results together with the values at cure are shown in Table 5. Hardness is determined by measuring the load required to indent the surface of a flat bar (⅛" thick x ½" wide) to a depth of 0.01 in. with a ¹⁄₃₂" dia. steel ball. Compressive strength is the strength at failure of cylinders (½" long x ¼" dia.) using a testing machine crosshead speed of 0.02 in./min.

EXAMPLE 2

Curable polyepoxide compositions are made by mixing a pre-prepared polyepoxide resin mix with an HF-complexed halide. The halide is chosen from SbCl$_5$, SnCl$_4$, TiCl$_4$, SiCl$_4$, FeCl$_3$ and AlCl$_3$. The complexed halide is added to the resin mix, in each composition, in amounts of 0.02 ml. of complex to 1.0 gm. of mix. The polyepoxide resin mix, in each composition, is a mix of MY 750 resin (supplied by CIBA (ARL) Ltd.) with 300 mesh acid-washed silica powder, the mix consisting of 0.4 gm. of resin for each 0.6 gm. of silica powder.

The halides are complexed by slowly adding each halide to an aqueous 40 vol. percent solution of HF the addition being effected at room temperature with continual stirring: SbCl$_5$, SnCl$_4$, TiCl$_4$ and SiCl$_4$ are liquids at ambient temperature and FeCl$_3$ and AlCl$_3$ are solids. The halides are added to the acid solution in proportions of 1:3 by wt.

Measurements were made of gel time and cure time in a moist environment and, for comparison, in a dry environment i.e. ambient humidity as described in Example 1.

The following gel and cure times are obtained for the HF-complexed halides.

| Halide | Dry | | Moist | |
|---|---|---|---|---|
| | Gel time | Cure time | Gel time | Cure time |
| SbCl$_5$ | 1' 0" | 1' 5" | | 0' 55" |
| SnCl$_4$ | 5' 30" | 7' 0" | 5' 0" | 5' 30" |
| SiCl$_4$ | 65' 0" | 85' 0" | ~30' 0" | ~40' 0" |
| AlCl$_3$ | | >4 hrs. | | ~2 hrs. |
| FeCl$_3$ | | >4 hrs. | | >4 hrs. |
| TiCl$_4$ | | >4 hrs. | | ~2 hrs. |

TABLE 5.—HARDNESS, COMPRESSIVE STRENGTHS AND HUMID AGING

| Metal halide | Complexing acid | Hardness, lbf. at 100% RH aging after— | | | | Compressive strength, lbf./in.² at 100% RH aging after— | | | |
|---|---|---|---|---|---|---|---|---|---|
| | | 0 | 14 days | 28 days | 100 days | 0 | 14 days | 28 days | 133 days |
| SbCl$_5$ | Benzene m di-sulphonic acid (33%) | 33.7 | 55.0 | 49.3 | 45.0 | 13,335 | 16,060 | 14,669 | 9,758 |
| SnCl$_4$ | do | | | | | | | | |
| SnCl$_4$ | HCl (35%) | 47.5 | 45.0 | 42.3 | 43.8 | 14,250 | 15,130 | 14,678 | 10,584 |
| SbCl$_5$ | HNO$_3$ (70%) | 10.2 | 33.5 | 32.0 | 31.8 | 10,535 | 11,135 | 14,316 | 8,641 |
| SnCl$_4$ | HNO$_3$ (70%) | 49.0 | 60.5 | 58.8 | 49.5 | 15,240 | 16,920 | 17,281 | 11,112 |
| SnCl$_4$ | p Toluene sulphonic acid (33%) | 45.0 | 49.0 | 43.5 | 46.0 | 14,585 | 15,235 | 15,209 | 12,043 |
| SnCl$_4$ | p Toluene sulphonic acid (66%) | 41.7 | 43.5 | 40.0 | 43.5 | 10,060 | 14,960 | 15,020 | 12,690 |
| SbCl$_5$ | p Toluene sulphonic acid (60%) | 36.8 | 48.0 | 44.5 | 42.5 | 10,140 | 14,080 | 12,160 | 9,981 |
| BF$_3$·2H$_2$O* | Benzene m di-sulphonic acid (33%) | 41.5 | 49.0 | 51.5 | 51.0 | 12,505 | 16,895 | 18,318 | 14,629 |
| | | 59.7 | 49.5 | 43.5 | | 19,561 | 18,856 | 16,738 | |

*Hardness measurements with ⅙" dia. steel ball (indented 0.01").

The results show that hardness and compressive strength values are substantially unaffected by exposure to moisture.

Apart from the tolerance to moisture of the epoxide compositions when curing and when cured the significance of water as a diluent in the aqueous acid solutions has to be considered. Diluent water affects the reactivity of complexes as shown in the following table (Table 6) which shows, by way of example, SnCl$_4$ and SbCl$_5$ complexed with toluene sulphonic acid. Increasing the dilution results in increased cure times.

It will be apparent that HF-complexed SbCl$_5$ and SnCl$_4$ provide relatively fast curing compositions: the curing time for SnCl$_4$, in particular, indicates the utility of this complex in dental work.

Measurements were also made of the hardness of dry air-cured and moist-cured compositions.

For the moist-cured compositions the resin mix and complex were first mixed in air for 30 secs. and then put in a humidity oven at 100% RH and 37° C. to cure: after curing the compositions were retained in the oven

TABLE 6.—EFFECT OF CONCENTRATION OF COMPLEXING ACID

| Metal halide | Complexing acid | Weight ratio of components | | | Gel time | Cure time |
|---|---|---|---|---|---|---|
| | | MH | CA | Water | | |
| SnCl$_4$ | Para toluene sulfonic acid | 100 | 200 | 200 | 1'5" | 1'20" |
| SnCl$_4$ | do | 100 | 100 | 200 | 2'15" | 6'45" |
| SbCl$_5$ | do | 100 | 200 | 100 | | 25" |
| SbCl$_5$ | do | 100 | 180 | 120 | 1'40" | 3'30" |
| SbCl$_5$ | do | 100 | 150 | 150 | 3'0" | 13'0" |

Complexes produced according to the invention do not fume in air, as do the metal halides from which they are formed, and they can be stored without visible change for at least 3 months.

for 4 hrs. As the hardness figures following show HF-complexed SbCl$_5$ and SnCl$_4$ compositions are substantially immune to the presence of moisture.

| Halide | Hardness air cure plus 4 hrs. (in lbs.) | Hardness moist cure plus 4 hrs. in humidity oven (in lbs.) |
|---|---|---|
| SbCl₅ | 51.0 | 41.0 |
| SnCl₄ | 50.5 | 46.5 |

The hardness values record the force applied to a 1/32″ dia. steel ball to form an indentation 0.010″ deep.

We claim:

1. A process for the spontaneous production of a mass of resin which cures rapidly in a moist environment but which remains plastic long enough to be shaped during use in a restorative dentistry which comprises intimately mixing a polyepoxide with a curing agent, said curing agent comprising a complex of a Friedel-Crafts' catalyst and an aqueous strong non-carboxylic acid having a dissociation constant of not less than $5 \times 10^{-4}$ or hydrofluoric acid, and curing said polyepoxide with said curing agent in said moist environment.

2. A process according to claim 1 in which the polyepoxide is derived from a dihydric phenol, and has not more hydroxyl groups per molecule than epoxide groups.

3. A process according to claim 1 in which the polyepoxide is a low molecular weight condensation product of diphenylolpropane with epichlorohydrin.

4. A process according to claim 1 in which the Friedel-Crafts' catalyst is a halide of aluminium, boron, antimony, titanium, silicon, iron or tin.

5. A process according to claim 1 in which the Friedel-Crafts' catalyst is $BF_3$, $SbCl_5$, $TiCl_4$, $SiCl_4$, $FeCl_3$, $AlCl_3$ or $SnCl_4$.

6. A process according to claim 1 in which the strong non-carboxylic acid is nitric acid, hydrochloric acid or a sulphonic acid.

7. A process according to claim 1, in which the curing agent is a complex of said Friedel-Crafts' catalyst and hydrofluoric acid.

8. A process according to claim 1 in which the ratio of curing agent to polyepoxide is from 0.02 to 0.2 millilitre per gram.

9. A process according to claim 1 in which there is pre-mixed with the resin an inert mineral in powder form.

10. A process according to claim 9, in which the inert mineral is silica.

11. A process according to claim 9 in which the inert mineral has a particle size of less than 100 mesh.

References Cited

UNITED STATES PATENTS

| | | | |
|---|---|---|---|
| 3,629,163 | 12/1971 | Nolken | 260—2 EC X |
| 2,824,083 | 2/1958 | Parry et al. | 260—47 EC |
| 3,503,128 | 3/1970 | Boyd et al. | 260—37 EP X |
| 3,396,117 | 8/1968 | Schuetze | 260—37 EP X |
| 2,436,238 | 2/1948 | Wadley et al. | 252—433 X |
| 2,810,774 | 10/1957 | Serniuk | 252—433 X |

OTHER REFERENCES

Kirk et al.: Encyclopedia of Chemical Technology; Interscience Encyclopedia Inc.; 1951; vol. 6, pp. 680 and 683; Sci. Lib., TP9 E68.

LEWIS T. JACOBS, Primary Examiner

U.S. Cl. X.R.

260—2 EC, 47 EC